(12) United States Patent
Park et al.

(10) Patent No.: US 10,275,003 B2
(45) Date of Patent: Apr. 30, 2019

(54) BACKUP POWER COMMUNICATION

(71) Applicant: HEWLETT PACKARD ENTERPRISE DEVELOPMENT LP, Houston, TX (US)

(72) Inventors: Justin H. Park, Houston, TX (US); Patrick A. Raymond, Houston, TX (US); David P. Mohr, Spring, TX (US); David K. Altobelli, Houston, TX (US); David W. Engler, Cypress, TX (US); Han Wang, Sugar Land, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 95 days.

(21) Appl. No.: 15/323,665

(22) PCT Filed: Oct. 27, 2014

(86) PCT No.: PCT/US2014/062374
§ 371 (c)(1),
(2) Date: Jan. 3, 2017

(87) PCT Pub. No.: WO2016/068840
PCT Pub. Date: May 6, 2016

(65) Prior Publication Data
US 2017/0160779 A1 Jun. 8, 2017

(51) Int. Cl.
*G06F 1/26* (2006.01)
*G06F 1/28* (2006.01)
(Continued)

(52) U.S. Cl.
CPC ............... *G06F 1/28* (2013.01); *G06F 1/263* (2013.01); *G06F 1/3275* (2013.01); *G06F 1/3287* (2013.01); *H02J 9/06* (2013.01)

(58) Field of Classification Search
CPC .......... G06F 1/28; G06F 1/263; G06F 1/3275; G06F 1/3287; H02J 9/06
(Continued)

(56) References Cited

U.S. PATENT DOCUMENTS

| 6,072,299 A | 6/2000 | Kurle |
| 6,329,839 B1 | 12/2001 | Pani |
| 6,735,704 B1 | 5/2004 | Butka et al. |

(Continued)

FOREIGN PATENT DOCUMENTS

| CN | 102211553 | 10/2011 |
| CN | 102315496 | 1/2012 |

(Continued)

OTHER PUBLICATIONS

David Baggaley, "Designing Smart Batteries into Medical Devices," Retrieved from Internet Sep. 29, 2014, http://inspiredenergy.com/about/News/Designing%20smart%20batteries%20into%20medical%20devices%20Dir%20cut.pdf >.

(Continued)

*Primary Examiner* — Austin Hicks
(74) *Attorney, Agent, or Firm* — Hewlett Packard Enterprise Patent Department

(57) ABSTRACT

Example implementations relate to backup power communication. For example, a system for backup power communication can include a shared backup power supply coupled to a node, a plurality of loads supported by the node, and a pass-through device to support multi-master communication between the shared backup power supply and the plurality of loads.

20 Claims, 4 Drawing Sheets

(51) Int. Cl.
*G06F 1/3234* (2019.01)
*G06F 1/3287* (2019.01)
*H02J 9/06* (2006.01)

(58) Field of Classification Search
USPC ............................................................. 713/323
See application file for complete search history.

(56) References Cited

U.S. PATENT DOCUMENTS

| | | |
|---|---|---|
| 7,395,198 B1 | 7/2008 | Roux |
| 8,513,832 B2 | 8/2013 | Hunter |
| 2004/0199796 A1 | 10/2004 | Boros |
| 2004/0255171 A1 | 12/2004 | Zimmer et al. |
| 2010/0017542 A1 | 1/2010 | Merry |
| 2010/0332858 A1 | 12/2010 | Trantham |
| 2010/0332862 A1 | 12/2010 | Lester et al. |
| 2013/0275780 A1 | 10/2013 | Miller |
| 2013/0300195 A1* | 11/2013 | Meng ..................... H02J 9/062 307/23 |
| 2014/0075218 A1* | 3/2014 | Bartling ................. G06F 13/00 713/320 |
| 2014/0242432 A1 | 8/2014 | Brown |
| 2015/0006943 A1* | 1/2015 | Suzuki ................... G06F 1/263 713/340 |
| 2015/0381237 A1* | 12/2015 | Griffith .................. H04B 3/546 375/258 |
| 2016/0043873 A1* | 2/2016 | Wendt .................... H04B 3/548 307/1 |

FOREIGN PATENT DOCUMENTS

| | | |
|---|---|---|
| CN | 203826512 | 9/2014 |
| TW | 201428476 | 7/2014 |

OTHER PUBLICATIONS

PCT/ISA/KR, International Search Report dated Jun. 10, 2015, 11 pps, PCT/US2014/062374.

* cited by examiner

BACKUP POWER COMMUNICATION

BACKGROUND

As reliance on computing systems continues to grow, so too does the demand for reliable power systems and back-up schemes for these computing systems. Servers, for example, may provide architectures for backing up data to flash or persistent memory as well as back-up power sources for powering this back-up of data after the loss of power. Backup power supplies may sometimes include energy components such as capacitors or batteries.

DETAILED DESCRIPTION

Figure 1:
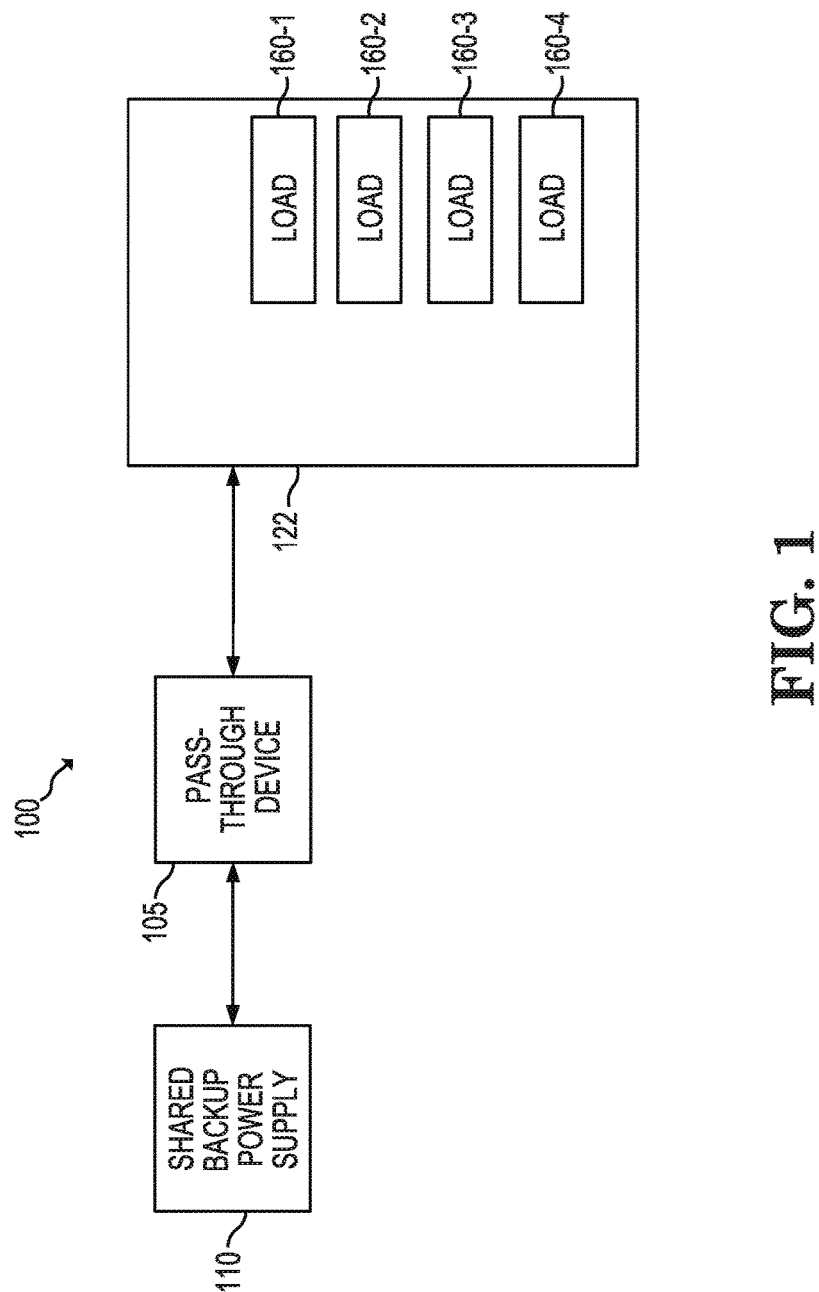
FIG. 1 illustrates a block diagram of an example of a system for backup power communication, according to the present disclosure.

A computing data storage system can include a plurality of nodes that support a plurality of loads. The nodes can be a plurality of servers, for example. A plurality of loads can include storage controllers or devices associated with the servers. For example, a load can include cache memory, dual inline memory modules (DIMMs), Non-Volatile Dual In-Line Memory Modules (NVDIMMs), and/or array control logic, among other storage controllers and/or devices associated with the servers. A computing data storage system can include a backup power system operatively coupled to the number of nodes to support the number of loads in an event of a removal of a primary power supply. The power system can include a backup power controller module that determines a number of loads that are to be protected with backup power from the backup power supply, and a backup power communication module that communicates backup power information from the backup power supply and the number of loads, using a multi-master communication protocol. As used herein, to be protected by the backup power supply can refer to the backup power supply providing battery backup power in order for data to be moved from cache memory to non-volatile memory.

A removal of a primary power supply can be scheduled or un-scheduled. For instance, a scheduled removal of the primary power supply can be the result of scheduled maintenance on the number of nodes and/or the number of loads. A scheduled removal of the primary power supply can be an intentional power down of the number of nodes and/or the number of loads to add and/or remove nodes to a chassis and/or network connected to a primary power supply. In another example, a scheduled removal of the primary power supply can be an intentional power down to add and/or remove one or more loads to or from one or more nodes.

An un-scheduled primary power supply removal can be a failure (e.g., an unintentional loss of power to the number of nods and/or loads from the primary power source) in the primary power supply. An un-scheduled primary power supply removal can occur when, for example, the primary power supply fails momentarily and/or for an extended period of time.

It may be desirable to move data from cache memory in the number of nodes to non-volatile memory upon the removal of a primary power supply. However, moving data from cache memory to non-volatile memory can involve a power supply. A backup power supply can be a secondary power supply that is used to provide power for moving data from cache memory to non-volatile memory when the primary power is removed. Further, the backup power supply can be a shared backup power supply, in that the shared backup power supply associated with a particular node is shared among a plurality of loads associated with that node.

Providing backup power for moving data from cache memory to non-volatile memory may include using a Baseboard Management Controller (BMC) unit to manage communication between the backup power supply and the number of loads. In such examples, the BMC unit can configure the shared backup power supply, discover all loads downstream from the shared backup power supply that are to be protected by the shared backup power supply, and confirm whether the shared backup power supply is capable of providing backup power for the discovered loads. In addition, the BMC unit can signal to the discovered loads, when the shared backup power supply is adequately charged. As used herein, an adequate charge of the shared backup power supply refers to a level of power stored in the shared backup power supply (e.g., a threshold) that is capable of providing a backup power supply to a specified number of loads.

In contrast, in accordance with examples of the present disclosure, a pass-through device supporting a multi-master communication protocol can enable the shared backup power supply to communicate directly with the number of loads. As used herein, a multi-master communication protocol refers to an environment, such as a server environment, where more than one master component controls the actions of the slave components. Enabling the shared backup power supply to communicate directly with the number of loads using the pass-through device and multi-master communication protocol, allows for more efficient handling of error communication between the shared backup power supply and the number of loads, as well as decreased time to configure the shared backup power supply to provide backup power for the number of loads.

FIG. 1 illustrates a block diagram of an example of a system 100 for backup power communication according to the present disclosure. As illustrated in FIG. 1, the system 100 can include a shared backup power supply 110, a pass-through device 105, and a node 122 coupled to the pass-through device. While FIG. 1 illustrates the pass-through device 105 as a separate component from the node 122, examples are not so limited. The pass-through device 105 can be located on the node 122, as discussed further in relation to FIG. 2 and FIG. 3. As illustrated in FIG. 1, the node 122 can support a plurality of loads (e.g., load 160-1, load 160-2, load 160-3, and load 160-4, collectively referred to herein as loads 160). For instance, the node 122 can support a plurality of storage controllers and/or a plurality of storage devices such as NVDIMMs.

The pass-through device 105, as used herein, is a device that supports a multi-master communication between the shared backup power supply 110 and the plurality of loads 160. In other words, the pass-through device 105 can support a communications protocol where the pass-through device 105 and the shared backup power supply 110 are master components of the system 100 and the loads 160 are slave components of the system 100. In some examples, the pass-through device 105 can be a BMC unit. The BMC unit can monitor the physical state of the node 122, and measure and report on internal physical parameters such as temperature, cooling fan speeds, power status, and operating system status, among other parameters. Thereby, the pass-through device can be a master component for the system 100. As used herein, a master component is a component of the system 100 that has unidirectional control over one or more other components of the system 100. As used herein, a slave component is a component of the system 100 that is controlled by a master component.

In accordance with examples of the present disclosure, the shared backup power supply 110 can also be a master component. The shared backup power supply 110 can use communication paths between the shared backup power supply 110 and the loads 160 to perform a number of functions, including setup and management of the loads 160. For instance, the shared backup power supply 110 can communicate with the loads 160 a sequence in which backup power is to be provided to the loads 160.

Referring to FIG. 1, load 160-1 can communicate to the shared backup power supply 110, that the load 160-1 will use 4 watts for battery backup. Load 160-2 can communicate to the shared backup power supply 110, that the load 160-2 will use 60 watts for battery backup. In response, the shared backup power supply 110 can communicate to load 160-2 to remain powered off until load 160-1 has completed backup procedures. As used herein, backup procedures can refer to moving data from cache memory to non-volatile memory.

In such a manner, the shared backup power supply 110 can communicate with the loads 160 a sequence in which backup power is to be provided to the loads 160. In some examples, each of the loads 160 can communicate to the shared backup power supply 110 an amount of power for backup procedures per a unit of time, for instance, in joules.

Alternatively and/or additionally, the pass-through device 105 can be system firmware, such as Basic Input/Output System (BIOS) implemented using processor executable instructions, and can provide initialization and testing of the hardware components of the node 122. BIOS can also load an operating system for the node 122 when it is powered on. In either event, the pass-through device 105 can support a communications protocol where both the shared backup power supply 110 and the pass-through device 105 act as master components of the system 100. In some examples, the multi-master communication protocol can be a management component transport protocol (MCTP), however, examples are not so limited and the multi-master communication protocol can be other protocols designed to provide monitoring and control functions inside the system 100.

While examples provided herein include BIOS and a BMC unit as examples of a pass-through device, examples of the present disclosure are not so limited. Other system components and system devices can be used to perform the various examples described in this disclosure. Furthermore, while specific examples are outlined herein, describing actions performed by BIOS and by a BMC unit, examples are not limited. Actions described as being performed by BIOS can be performed by a BMC unit and/or other types of pass-through devices and vice versa.

Figure 2:
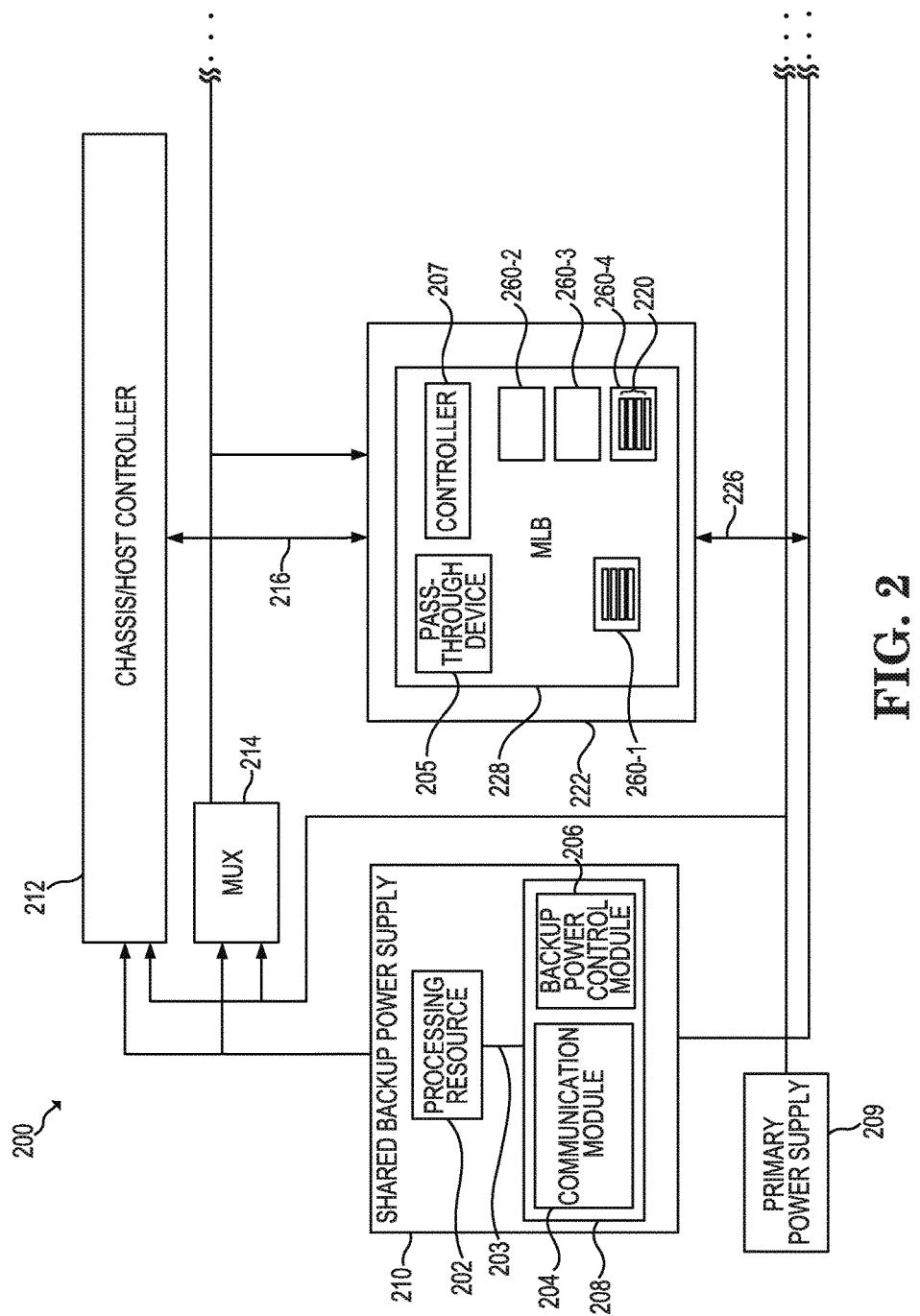
FIG. 2 illustrates a detailed block diagram of an example of a system for backup power communication, according to the present disclosure.

FIG. 2 illustrates a detailed block diagram of an example of a system 200 for backup power communication according to the present disclosure. FIG. 2 includes the shared backup power supply 210, a multiplexer (MUX) 214, a chassis/host controller 212, and a node 222.

As illustrated in FIG. 2, the node 222 can host a plurality of loads (e.g., loads 260-1, 260-2, 260-3, 260-4, collectively referred to herein as loads 260). For instance, the node 222 can include a plurality of devices, such as local memory or data storage (e.g., referred generally as memory). The memory may contain volatile and non-volatile memory, e.g., cache and non-volatile memory dual inline memory modules (NVDIMM). Thus, each memory in the node 222 can contain a plurality of NVDIMM slots 220. Each NVDIMM slot among the number of NVDIMM slots 220 can provide a load to the system 200. Node 222 can include other devices such as cache memory, DIMMs, array control logic, and storage controllers, among other devices associated with the node 222, and each of the devices associated with the node 222 can provide a load to the system 200. For instance, load 260-2 can be provided by a storage controller, whereas each NVDIMM slot among the number of NVDIMM slots 220 can provide load 260-1. In some examples, the node 222 can also include a control logic unit (not illustrated in FIG. 2).

The shared backup power supply 210 can include a processing resource 202 connected via a connection 203 to a memory resource 208, e.g., a computer-readable medium (CRM), machine readable medium (MRM), database, etc. In some examples, memory resource 208 may be a non-transitory storage medium and/or a non-transitory machine readable medium, where the term "non-transitory" does not encompass transitory propagating signals.

The memory resource 208 can include a plurality of computing modules. The example of FIG. 2 shows a communication module 204 and a backup power control module 206. As used herein, a computing module can include program code, e.g., computer executable instructions, hardware, firmware, and/or logic. But a computing module at least includes instructions executable by the processing resource 202, e.g., in the form of modules, to perform particular actions, tasks, and functions described in more detail herein in reference to FIGS. 3 and 4.

Instructions associated with a particular module, e.g., communication module 204 and backup power control module 206, when executed by the processing resource 202 can also be referred to and function collectively as a component and/or computing engine. As used herein, an engine can include hardware firmware, logic, and/or executable instructions. But an engine at least includes hardware e.g., logic in the form of an application specific integrated circuit (ASIC), to perform particular actions, tasks and functions described in more detail herein in reference to FIGS. 3 and 4.

Engines and/or the number of modules, e.g., communication module 204 and backup power control module 206 shown in FIG. 2, can be sub-engines/modules of other engines/modules and/or combined to perform particular actions, tasks, and functions within a particular system and/or computing device. Engines and/or modules described herein can be located in a single system and/or computing device or reside in separate distinct locations in a distributed computing environment, e.g., cloud computing environment.

Figure 3:
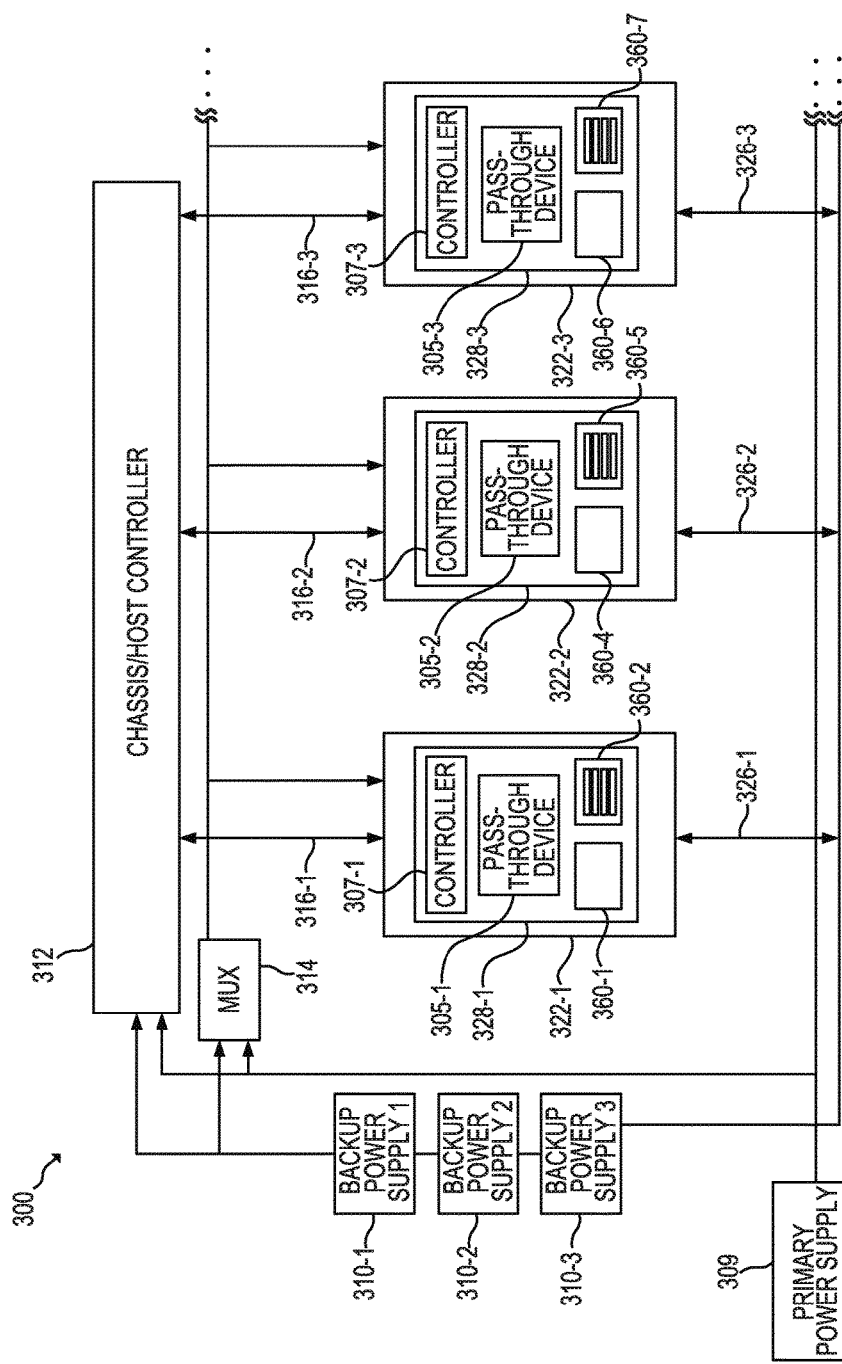
FIG. 3 illustrates a block diagram of an example of a system for backup power communication, the system having a plurality of shared backup power supplies, according to the present disclosure.
Figure 4:
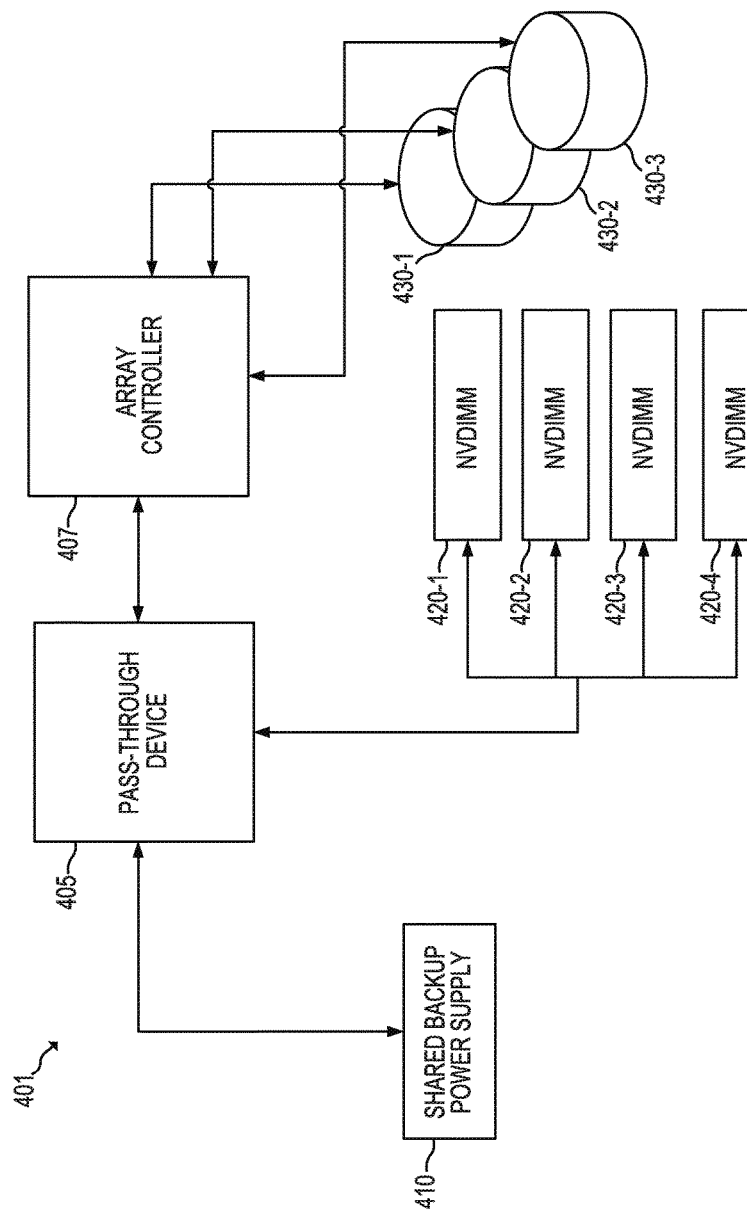
FIG. 4 illustrates a flow diagram of a communication path between a plurality of loads and a shared backup power supply, according to the present disclosure.

The system 200 can perform a number of functions and operations as described in FIGS. 3, and 4, and include the apparatus and methods for backup power communication as described herein.

The shared backup power supply 210 can be a battery hat is external to the node 222 and external to the chassis/host controller 212 supporting the node 222. The shared backup power supply 210 can provide power to the node 222. The shared backup power supply 210 can support different chassis/host controllers, e.g., not shown, and different MUXs (not shown) to support a plurality of nodes on different chassis.

The node 222 can include a main logic board (MLB) 228, and the MLB 228 can include a pass-through device 205. As described in relation to FIG. 1, the pass-through device 205 (e.g., the pass-through device 105 illustrated in FIG. 1), can be internal to, or external to, the node 222. Further, the pass-through device 205 can be system firmware, such as a BMC unit and/or BIOS. The MLB 228 components can allow the node 222 to communicate with the shared backup power supply 210 and the chassis/host controller 212. For example, the pass-through device 205 can support a communication protocol between the shared backup power supply 210 and the loads 260. Also, the node 222 can include a controller 207, such as a storage array controller. A storage array controller can be a device which manages data storage among physical disk drives within the computing system 200.

Signal and control lines can connect the shared backup power supply 210 to the chassis/host controller 212 and to the MUX 214. The MUX 214 and the chassis/host controller 212 can be coupled to the node 222 via a signal line 216. The signal line 216 can provide for the install, registering, data, and clocking of the node 222 with the chassis/host controller 212.

In some examples, the control logic (not illustrated in FIG. 2) can be coupled to the node 222 via a control signal and power line 226. For example, the node 222 can provide a signal to the control signal and power lines 226 and the signal lines 216 when data is to be backed up to non-volatile memory. The control signal and power lines 226 and the signal lines 216 also couple the chassis/host controller 212 to the node 222 and the control logic.

The pass-through device 205 can allow the node 222 to communicate with the shared backup power supply 210 and vise versa. For instance, the pass-through device 205 can be a BMC unit. The BMC unit can enable the shared backup power supply 210 to send a request to the loads 260, using the pass-through device 205. In response to receiving the request from the shared backup power supply 210, the loads 260 can send a response to the shared backup power supply 210, using the pass-through device 205. For instance, the shared backup power supply 210 can request, from the loads 260, identification of loads to be protected by the shared backup power supply 210. In other words, the shared backup power supply 210 can query the loads 260. The loads 260 can respond to the shared backup power supply 210 with a message identifying a subset of the loads 260 that are to be protected by the shared backup power supply 210. In other words, the loads 260 can respond to the query from the shared backup power supply. In some examples, the loads 260 can respond to the query during startup of the node 222.

Further, in response to the shared backup power supply 210 receiving the response from the loads 260, the shared backup power supply 210 can communicate backup power information to the subset of the loads, using the pass-through device 205. The backup power information which is communicated from the shared backup power supply 210 to the subset of the loads can be information pertaining to the amount, rate, and/or timing of backup power to be provided to the loads 260 and/or the subset of the loads.

For instance, the backup power information can include a message indicating that the shared backup power supply 210 has adequate backup power for the subset of loads. Additionally and/or alternatively, the backup power information can include a message to enable a first portion of loads among the subset of loads and to disable a second portion of loads among the subset of loads. For example, if the response from the loads 260 to the shared backup power supply 210 indicates that load 260-2 will use 18 watts of power, and load 260-4 will use 120 watts of power, the backup power information communicated from the shared backup power supply 210 to the loads 260 can include a message to load 260-2 to remain disabled while load 260-4 is enabled and completes backup processes. As used herein, a disabled load refers to a load that is powered off and/or in a retaining mode. Also, as used herein, an enabled load refers to a load that is powered on and/or has write-back cache turned on.

The backup power information can also include a message from the shared backup power supply 210 to the subset of loads indicating a sequence of delivery of backup power to the subset of loads during backup. For instance, if load 260-2 consumes an amount of power exceeding a threshold level of power over a threshold period of time, the shared backup power supply 210 can keep loads 260-1, 260-3, and 260-4 disable (e.g., off) until load 260-2 has done it's backup. Once load 260-2 has completed the backup process, the shared backup power supply 210 can communicate to load 260-1 that it can turn on and backup data, but loads 260-3 and 260-4 can remain disabled. In this manner, the shared backup power supply 210 can communicate to the loads 260 that load 260-2 will receive backup power first, followed by load 260-1, followed by load 260-3 and load 260-4. Examples are not limited to this particular sequence, however, and the shared backup power supply 210 can communicate, to the loads 260 during backup, alternative sequences by which the loads are to receive battery backup power.

In some examples, as discussed further in relation to FIG. 3, the shared backup power supply 210 can communicate to other shared backup power supplies. For example, the shared backup power supply 210 can communicate information about the charge status of the shared backup power supply 210 and/or the output status of the shared backup power supply 210 to other shared backup power supplies.

For example, the system 200 can include a plurality of parallel shared backup power supplies, including shared backup power supply 210. Each of the parallel shared backup power supplies can communicate to one another and different backup power supplies can distribute backup power to the loads 260.

As used herein, a charge status can refer to the charge level of the shared backup power supply, the presence of the shared backup power supply itself, and/or the presence of charging errors in the shared backup power supply. Also, as used herein, an output status can refer to the presence of and/or amount of battery backup power output from the shared backup power supply.

The backup power control module 206 can have instructions stored in a non-transitory storage medium (e.g., memory resource 108) to determine how many loads among the plurality of loads 260 are to be protected with backup power. In order to provide adequate backup power to the loads 260, the shared backup power supply 210 can identify how many loads among the loads 260 are to be protected by the shared backup power supply 210, and how much power they will use for a backup process.

In accordance with examples of the present disclosure, the shared backup power supply 210 can communicate with each of the plurality of loads 260, through the pass-through device 205, and receive a response directly from the plurality of loads 260 rather than waiting for a BMC unit to correlate messages to the shared backup power supply 210. Using the backup power control module 206, the shared backup power supply 210 can directly determine how many loads among the loads 260 are to receive backup power.

Also, using the communication module 204, the shared backup power supply 210 can communicate backup power information from the shared backup power supply 210 and the loads 260 using a multi-master communication protocol. In a number of examples, the shared backup power supply 210 can communicate with the loads 260 in band. As used herein, communicating in band refers to communicating messages, information, and/or data in the main data stream for the system.

In some examples, the backup power control module 206 and/or the communication module 204 can identify error information to and/or from the shared backup power supply 210 and the loads 260. The shared backup power supply 210 can identify a failure as the failure occurs using the backup power control module 206, and can notify the loads 260 of the failure using the communication module 204, In other words, the communication module 204 can communicate a failure notice to each of the plurality of loads during runtime. As used herein, a failure refers to an error and/or malfunction in the shared backup power supply in which the shared backup power supply 210 is incapable of providing backup battery power to the loads 260. Also, a failure notice refers to a communication identifying a failure. In some examples, the shared backup power supply 210 can identify the failure prior to the failure occurring. In response to the shared backup power supply 210 identifying the failure, the shared backup power supply 210 can communicate to the loads 260 instructing the loads to turn off their write back cache because the shared backup power supply 210 will be turning off the backup power supplied. In such an instance, the shared backup power supply 210 can communicate to the loads directly, using the communication module 204 and through the pass-through device 205. In this sense, the shared backup power supply 210 can communicate directly with the loads 260, without waiting for the pass-through device 205 to initiate communication.

As described herein, the pass-through device 205 can allow the shared backup power supply 210 to communicate with the loads 260 directly. While examples described herein include the shared backup power supply 210 communicating with the loads 260 to identify loads for backup and identify failures, examples are not so limited. The shared backup power supply 210 can communicate additional information to and from the loads, such as reactions, and in a parallel system as described in FIG. 3, the shared backup power supply 210 can communicate with other shared backup power supplies to distribute power to the loads 260.

FIG. 3 illustrates a detailed block diagram of an example of a system 300 for backup power communication according to the present disclosure. Although illustrated in simplified form in FIG. 3, it is to be understood that shared backup power supplies 310-1, 310-2, and 310-3 each include the components of the shared backup power supply 210 illustrated in FIG. 2.

As illustrated in FIG. 3, the system 300 can include a plurality of nodes, where each node has a separate shared backup power supply. For example, the system 300 can include a plurality of nodes 322-1, 322-2, 322-3 (herein referred to as nodes 322), and each of the nodes 322 can have an associated shared backup power supply. That is, node 322-1 can be associated with shared backup power supply 1 (e.g., 310-1), node 322-2 can be associated with shared backup power supply 2 (e.g., 310-2), and node 322-3 can be associated with shared backup power supply 3 (e.g., 310-3).

As described in relation to FIGS. 1 and 2, each of the nodes 322 can have a plurality of components. For instance, each of the nodes 322 can have an MLB (e.g., 328-1, 328-2, and 328-3), each of the plurality of MLBs can include pass-through devices (e.g., 305-1, 305-2, 305-3, referred to as pass-through devices 305), and each of the plurality of MLBs can include a storage array controller (e.g., 307-1, 307-2, 307-3, referred to as storage array controllers 307). While FIG. 3 illustrates a "controller" in each node, each controller is interpreted to be a storage array controller. While FIG. 3 shows three (3) nodes 322-1, 322-2, and 322-3, the system 300 can have fewer or more nodes than illustrated. Similarly, each of the plurality of nodes 322 can include a plurality of loads (e.g., loads 360-1, 360-7, hereinafter referred to as loads 360). For example, the nodes 322 may host six (6) or more loads (e.g., two loads per node).

In some examples, more or fewer loads can be hosted in a node, and each of the nodes 322 can host a different number of loads. For instance, node 322-1 can host four (4) loads (e.g., two storage controllers and two storage devices) while node 322-2 can host six (6) loads (e.g., three storage controllers and three storage devices). In this manner, each of the plurality of nodes 322 can include a plurality of loads, and the plurality of loads within a node can have a shared backup power supply.

In some examples, a multi-master communication protocol supported by the pass-through devices 305 can enable a first shared backup power supply to send a charge status message to a second shared backup power supply. For example, shared backup power supply 1 310-1 can send a message to shared backup power supply 2 310-2, through the pass-through devices 305-1 and 305-2, indicating that shared backup power supply 1 310-1 has adequate power to provide backup power to loads 360-1 and 360-2.

The shared backup power supplies 310-1, 310-2, and 310-3 can also determine which loads among the loads 360 are to receive backup power from which shared backup power supply. For example, shared backup power supply 1 310-1 can provide backup power to loads 360-1 and 360-4, while shared backup power supply 2 310-2 can provide backup power to loads 360-2 and 360-5, and shared backup power supply 3 310-3 can provide backup power to loads 360-6 and 360-7. In this manner, the shared backup power supplies 310 can communicate with other shared backup power supplies, using the pass-through devices 305, in order to distribute power to the loads 360.

FIG. 4 illustrates a flow diagram of a communication path 401 between a plurality of loads and a shared backup power supply according to the present disclosure. Particularly, FIG. 4 illustrates a flow diagram of communication between a plurality of storage controllers and storage devices and the shared backup power supply 410. FIG. 4 illustrates the communication between these components, and is not intended to illustrate structural components, as such components are illustrated in FIGS. 1-3.

As discussed in relation to FIGS. 1-3, a node (e.g., node 222 illustrated in FIG. 2, and the plurality of nodes 322 illustrated in FIG. 3) can host a plurality of loads. For example, as illustrated in FIG. 4, the node can include four NVDIMMs (420-1, 420-2, 420-3, and 420-4, herein referred to as NVDIMMS 420), and three storage devices (e.g., 430-1, 430-2, and 430-3, herein referred to as storage devices 430), such as solid state drives (SSDs) and/or hard disc drives (HDDs). The communication path 401 can also include the pass-through device 405 (e.g., pass-through device 105 illustrated in FIG. 1, pass-through device 205 illustrated in FIG. 2, and pass-through device 305 illustrated in FIG. 3) as well as the shared backup power supply 410 (e.g., shared backup power supply 110 illustrated in FIG. 1, and shared backup power supplies 310 illustrated in FIG. 3).

The shared backup power supply 410 can communicate with the loads, such as the storage devices 430, through the pass-through device 405, to determine how many (e.g., a subset) of the loads are to be protected with backup power. In some examples, this determination may be performed during startup of the node.

As illustrated by FIG. 4, using the multi-master communication protocol supported by the pass-through device 405, the shared backup power supply 410 can communicate with the storage devices 430 to determine that particular storage devices (e.g., storage device 430-1 and storage device 430-2) are to be protected with backup power from the shared backup power supply 410. Once the shared backup power supply 410 determines the number of loads that are to be protected with backup power, the shared backup power supply 410 can be configured with the correct number of loads (e.g., the subset of the loads). Similarly, the shared backup power supply 410 can determine the charge level that will be used to provide backup power to the loads and/or a subset of the loads.

In response to identifying the loads which are to be protected with backup power from the shared backup power supply 410, the shared backup power supply 410 can communicate information back to the loads, using the multi-master communication protocol supported by the pass-through device 405. For example, the shared backup power supply 410 can communicate the state of the shared backup power supply 410 to the loads. In another example, the shared backup power supply 410 can communicate to the loads, the duration of time until the shared backup power supply 410 is adequately charged (e.g., fully charged). As used herein, an adequate charge of the shared backup power supply refers to a level of power stored in the shared backup power supply that is capable of providing backup power supply to a specified number of loads.

Also, as described in relation to FIG. 1, FIG. 2, and FIG. 3, the shared backup power supply 410 can communicate to the loads a sequence in which backup power will be provided to the loads. For instance, in response to identifying that storage devices 430-1 and 430-2 are to be protected by the shared backup power supply 410, shared backup power supply 410 can communicate, to storage devices 430-1 and 430-2, a sequence in which battery backup will be provided. Upon removal of the primary power supply, and in response to receiving the sequence from the shared backup power supply 410, storage device 430-1 can remain powered off while shared backup power supply 410 provides backup power to storage device 430-2. Storage device 430-2 can then move data from the cache memory in storage device 430-2 to non-volatile memory, such as in NVDIMMs 420. Once storage device 430-2 has completed backup procedures, shared backup power supply 410 can communicate, through the pass-through device 405 and using the multi-master communication protocol, an instruction for storage device 430-2 to power off and storage device 430-1 to power on. Storage device 430-1 can then move data from the cache memory in storage device 430-1 to non-volatile memory, such as in NVDIMMs 420.

In some examples, the shared backup power supply 410 can act as a storage division management device, and can communicate information to the loads using the pass-through device 405 during runtime. For example, the shared backup power supply 410 can communicate setup information to NVDIMMs 420, to express bay system components, and/or browning system components. Additionally and/or alternatively, the shared backup power supply 410 can communicate, to the loads, error and/or failure information. For instance, prior to or concurrently with identifying a failure in the shared backup power supply 410, the shared backup power supply can communicate, through the pass-through device 405, information identifying the failure and instructing storage devices 430 to turn off their write back cache. Similarly, the shared backup power supply 410 can communicate with the storage devices 430, through the pass-through device 405, and notify the storage devices 430 when they can turn back on their write back cache.

In the present disclosure, reference is made to the accompanying drawings that form a part hereof, and in which is shown by way of illustration how a number of examples of the disclosure may be capable of being practiced. These examples are described in sufficient detail to enable those of ordinary skill in the art to practice the examples of this disclosure, and it is to be understood that other examples may be capable of being used and that process, electrical, and/or structural changes may be capable of being made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

The above specification, examples and data provide a description of the method and applications, and use of the system and method of the present disclosure. Since many examples may be capable of being made without departing from the spirit and scope of the system and method of the present disclosure, this specification merely sets forth some of the many possible example configurations and implementations.

What is claimed is:

1. A non-transitory machine readable medium storing instructions executable by a processing resource of a shared backup power supply to:
   send, by the shared backup power supply to a plurality of loads of a node, a request using and through a pass-through device supporting a multi-master communication protocol permitting the shared backup power supply and the pass-through device to, as master devices, both control the loads as slave devices to the master drives;

receive, by the shared backup power supply, a response from the plurality of loads, the responses identifying a subset of the plurality of loads that are to be protected by the shared backup power supply; and communicate by the shared backup power supply to the subset, backup power information using the multi-master communication protocol on the pass-through device.

2. The medium of claim 1, wherein the backup power information includes a message indicating that the shared backup power supply has a threshold level of power to supply backup battery power for the subset.

3. The medium of claim 1, wherein the backup power information includes a message to enable a first portion of loads among the subset of loads and to disable a second portion of loads among the subset of loads as the shared backup power supply charges.

4. The medium of claim 1, the shared backup power supply to send messages to other shared backup power supplies indicating at least one of:
a charge status of the shared backup power supply; and
a output status of the shared backup power supply.

5. The medium of claim 1, wherein the backup power information includes a message from the shared backup power supply to the subset indicating a sequence of delivery of backup power to the subset during backup.

6. The medium of claim 5, wherein the backup power information includes a message from the shared backup power supply to the subset instructing a second load among the subset of loads to remain in a retaining mode until a first load among the subset of loads has completed a data backup.

7. The medium of claim 1, wherein the pass-through device is a baseboard management controller (BMC) communicatively connected to both the shared backup power supply and the loads of the node.

8. A method comprising:
sending, by a shared backup power supply to a plurality of loads of a node, a request using and through a pass-through device supporting a multi-master communication protocol permitting the shared backup power supply and the pass-through device to as master devices both control the loads as slave devices to the master drives;
receiving, by the shared backup power supply, a response from the plurality of loads, the responses identifying a subset of the plurality of loads that are to be protected by the shared backup power supply; and
communicating, by the shared backup power supply to the subset, backup power information using and through the multi-master communication protocol on the pass-through device.

9. The method of claim 8, wherein the backup power information includes a message indicating that the shared backup power supply has a threshold level of power to supply backup battery power for the subset.

10. The method of claim 8, wherein the backup power information includes a message to enable a first portion of loads among the subset of loads and to disable a second portion of loads among the subset of loads as the shared backup power supply charges.

11. The method of claim 8, the shared backup power supply to send messages to other shared backup power supplies indicating at least one of:
a charge status of the shared backup power supply; and
a output status of the shared backup power supply.

12. The method of claim 8, wherein the backup power information includes a message from the shared backup power supply to the subset indicating a sequence of delivery of backup power to the subset during backup.

13. The method of claim 12, wherein the backup power information includes a message from the shared backup power supply to the subset instructing a second load among the subset of loads to remain in a retaining mode until a first load among the subset of loads has completed a data backup.

14. The method of claim 8, wherein the pass-through device is a baseboard management controller (BMC) communicatively connected to both the shared backup power supply and the loads of the node.

15. A backup power supply comprising:
communication hardware to communicate with a plurality of loads of a node and with a pass-through device supporting a multi-master communication protocol permitting the shared backup power supply and the pass-through device to as master devices both control the loads as slave devices to the master drives;
a processing resource to:
send, to the plurality of loads of a node, a request using and through the pass-through device;
receive a response from the plurality of loads, the responses identifying a subset of the plurality of loads that are to be protected by the shared backup power supply; and
communicate, to the subset, backup power information using and through the multi-master communication protocol on the pass-through device.

16. The backup power supply of claim 15, wherein the backup power information includes a message indicating that the shared backup power supply has a threshold level of power to supply backup battery power for the subset.

17. The backup power supply of claim 15, wherein the backup power information includes a message to enable a first portion of loads among the subset of loads and to disable a second portion of loads among the subset of loads as the shared backup power supply charges.

18. The backup power supply of claim 15, the shared backup power supply to send messages to other shared backup power supplies indicating at least one of:
a charge status of the shared backup power supply; and
a output status of the shared backup power supply.

19. The backup power supply of claim 15, wherein the backup power information includes a message from the shared backup power supply to the subset indicating a sequence of delivery of backup power to the subset during backup.

20. The backup power supply of claim 19, wherein the backup power information includes a message from the shared backup power supply to the subset instructing a second load among the subset of loads to remain in a retaining mode until a first load among the subset of loads has completed a data backup.

* * * * *